United States Patent Office 3,190,880
Patented June 22, 1965

3,190,880
17-TETRAHYDROPYRANYL ETHERS OF ANDROSTANES
Alexander D. Cross, Mexico City, Mexico, assignor to Syntex Corporation, Panama, Panama, a corporation of Panama
No Drawing. Filed Nov. 12, 1963, Ser. No. 323,124
Claims priority, application Mexico, Feb. 28, 1963, 71,076
The portion of the term of the patent subsequent to Feb. 23, 1982, has been disclaimed
19 Claims. (Cl. 260—239.55)

This invention relates to novel cyclopentanopolyhydrophenanthrene derivatives and to processes for the preparation thereof.

More particularly, this invention relates to novel 17-tetrahydropyranyl ethers of 6-substituted-$\Delta^4$-androstenes, 6-substituted-$\Delta^{4,6}$-androstadienes, and the corresponding 19-nor derivatives, all represented by the general formula:

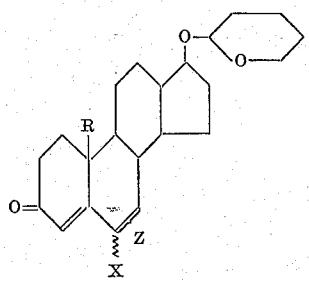

In this formula R represents hydrogen or methyl, X represents methyl, fluoro or chloro, Z represents either a saturated linkage or a double bond between the carbon atoms at the 6- and 7-positions, and the symbol $\xi$ indicates that when Z represents a saturated linkage the substituent attached at the 6-position of the steroid nucleus can be in either the $\alpha$- or the $\beta$-configuration.

A considerable amount of research in the steroid field has been done in the area of anabolic agents, inasmuch as such compounds are useful in many areas of human and veterinary medicine. Thus, for example, one important application of anabolic agents in human therapy is in cases where the patient suffers from any of a number of debilitating diseases or conditions which produce a negative nitrogen balance, such as deficient nutrition or growth, chronic cachetic diseases, and osteoporosis, wherein it is necessary to increase the metabolism of proteins and obtain a positive nitrogen balance and greater deposition of calcium in bone tissues. Similarly, anabolic agents are extremely useful in the post-operative treatment of patients recovering from major surgical operations.

It is known that androstane derivatives such as testosterone, 19-nortestosterone and various substituted derivatives thereof exhibit good anabolic activity when administered parenterally and that this is particularly the case with 17$\alpha$-alkyl substituted derivatives such as 17$\alpha$-methyltestosterone, 6$\alpha$,17$\alpha$-dimethyltestosterone, 2-hydroxymethylene-17$\alpha$-methyldihydroallotestosterone, 2$\alpha$,17$\alpha$-dimethyldihydroallotestosterone, and the like. However, it is also known that androstane derivatives of the type in question which do not have a 17$\alpha$-alkyl substituent exhibit either very low anabolic activity or not anabolic activity at all when administered orally.

The present invention is based on the surprising and unexpected discovery that the 6-substituted-$\Delta^4$-androstene, 6-substituted-$\Delta^{4,6}$-androstadiene, 6-substituted-19-nor-$\Delta^4$-androstene and 6-substituted-19-nor-$\Delta^{4,6}$-androstadiene 17-tetrahydropyranyl ethers represented by the above general formula, unlike the corresponding 17-unetherified compounds, exhibit good anabolic activity when administered orally. In addition, the androgenic activity of these 17$\beta$-tetrahydropyranyloxy derivatives is low. Thus, when their anabolic/androgenic activity is measured by administering them orally to castrated young male rats and then determining the response to this treatment by increases in the weights of the ventral prostate, seminal vesicles and levator ani muscle, it is found that these 17-tetrahydropyranyl ethers posses very low androgenic activity, while their anabolic activity is markedly greater than that of testosterone.

These novel 17-tetrahydropyranyl ethers also possess anti-estrogenic activity, lower blood cholesterol levels, and inhibit the secretion of gonadotrophins by the pituitary gland.

The 17$\beta$-tetrahydropyranyloxy-6-substituted-$\Delta^4$-androstenes-$\Delta^{4,6}$-androstadienes and their corresponding 19-nor derivatives of the present invention are obtained from the corresponding 17$\beta$-hydroxy steroids by conventional methods of preparing tetrahydropyranyl ethers of steroids having free hydroxyl groups. Thus, the free 17$\beta$-hydroxyl-containing parent compound can be reacted, under substantially anhydrous conditions, with an excess of dihydropyran in the presence of a small amount of an acidic catalyst, e.g., hydrochloric acid, p-toluenesulfonic acid, boron trifluoride etherate, and the like, either alone or together with an inert organic solvent, such as benzene, diethyl ether, or the like, at a temperature of from about 0° C. to about 50° C., and preferably at room temperature (about 25° C.), for from about 1 hour to about 72 hours.

These novel compounds can be administered in any of a number of conventional pharmaceutical forms, and particularly in ones suited for oral administration, e.g., in solid form, such as in pills, powders, capsules, tablets, or the like, or in liquid form, as syrups, emulsions, suspensions, and the like.

In order that those skilled in the art can more fully understand the present invention, the following examples are set forth. These examples are given solely for the purpose of illustrating the invention, and should not be considered as expressing limitations unless so set forth in the appended claims.

PREPARATION A

To a solution of 5 grams of 19-nortestosterone in 35 cc. of anhydrous dioxane there were added 5 cc. of ethyl orthoformate and 150 mg. of p-toluenesulfonic acid monohydrate. The resulting reaction mixture was stirred for 30 minutes, following which it was cooled and then slowly admixed, with stirring, with 12 cc. of pyridine and 500 cc. of water. The resulting mixture was extracted with ether and the extract was washed with water, then dried over anhydrous sodium sulfate and finally evaporated to dryness under reduced pressure. Recrystallization of the residue from methanol gave the 3-ethyl enol ether of 19-nortestosterone.

Five grams of the thus-obtained 3-ethyl enol ether were admixed with 2 grams of sodium acetate, 100 cc. of acetone and 20 cc. of water and then cooled to 0° C. Next, 2 grams of N-chlorosuccinimide and 2 cc. of glacial acetic acid were added and the resulting reaction mixture was then stirred for 30 minutes, keeping the temperature at between 0° C. and 5° C. during this time. The reaction mixture was then diluted with 250 cc. of water and kept overnight in a refrigerator. The resulting precipitate was collected from the diluted reaction mixture by filtration, washed with water, dried under vacuum and crystallized from acetone, thus giving 6β-chloro-19-nortestosterone.

A mixture of 1 gram of the thus-obtained 6β-chloro compound, 40 cc. of glacial acetic acid and 1 cc. of aqueous concentrated hydrochloric acid was held at room temperature for 2 hours and then diluted with water. The resulting precipitate was collected by filtration, washed with water, dried under vacuum and recrystallized from acetone-hexane, thus giving 6α-chloro-19-nor-testosterone.

PREPARATION B

A mixture of 1 gram of 6β-chlorotestosterone, 2 grams of chloranil and 50 cc. of t-butanol was refluxed for 8 hours. Following this reaction period the mixture was cooled and the excess of chloranil was filtered off and washed with a large volume of ethyl acetate. These washings were added to the filtrate, and the resulting combined organic solution was then washed with a cold aqueous 10% sodium hydroxide solution until the washings were colorless. The organic layer (chiefly ethyl acetate, containing the product) was then dried over anhydrous sodium sulfate and evaporated to dryness. The residue was crystallized from methylene chloride/diethylether, after decolorization with alumina, to give 6-chloro-6-dehydrotestosterone.

By repeating this procedure in every detail but one, namely, replacing 6β-chlorotestosterone with 6α-fluorotestosterone, 6α-methyltestosterone, 6α-fluoro-19-nortestosterone, 6α-chloro-19-nortestosterone and 6α-methyl-19-nortestosterone, respectively, the corresponding 6-dehydro steroids, namely, 6α-fluoro-6-dehydrotestosterone, 6 - methyl - 6 - dehydrotestosterone, 6 - fluoro-19-nor-6-dehydrotestosterone, 6 - chloro-19-nor-6-dehydrotestosterone and 6-methyl-19-nor-6-dehydrotestosterone, respectively, were obtained.

*Example*

To a solution of 1 gram of 6α-fluorotestosterone in 25 cc. of benzene there was added 2 cc. of dihydropyran. Next, approximately, 5 cc. of the mixture of benzene and dihydropyran was distilled off to remove moisture, and the remaining mixture was then cooled to room temperature. To the cooled mixture there was then added 0.1 gram of p-toluenesulfonic acid, and the resulting reaction mixture was held at room temperature for 72 hours. Following this reaction period the reaction mixture was washed with an aqueous 5% sodium carbonate solution and then with water until neutral, then dried over anhydrous sodium sulfate and evaporated to dryness. The dry residue was then chromatographed by passing it, dissolved in hexane, through a column of neutral alumina, thus giving the 17-tetrahydropyranyl ether of 6α-fluorotestosterone (6α-fluoro-17β-tetrahydropyranyloxy-Δ⁴-androsten-3-one).

By repeating this procedure in every detail but one, namely, replacing 6α-fluorotestosterone with 6β-fluorotestosterone, 6α - chlorotestosterone, 6β - chlorotestosterone, 6α-methyltestosterone, 6β-methyltestosterone, 6-fluoro-6-dehydrotestosterone, 6 - chloro - 6 - dehydrotestosterone, 6-methyl-6-dehydrotestosterone, 6α - fluoro-19-nortestosterone, 6β-fluoro-19-nortestosterone, 6α-chloro-19-nortestosterone, 6β-chloro - 19 - nortestosterone, 6α-methyl-19-nortestosterone, 6β-methyl-19-nor-testosterone, 6-fluoro-19-nor-6-dehydrotestosterone, 6-chloro-19-nor-6-dehydrotestosterone and 6-methyl-19-nor-6-dehydrotestosterone, repsectively, the corresponding 17 - tetrahydropyranyl ethers, namely 6β-fluoro-17β-tetrahydropyranyloxy-Δ⁴-androsten-3-one,
6α-chloro-17β-tetrahydropyranyloxy-Δ⁴-androsten-3-one,
6β-chloro-17β-tetrahydropyranyloxy-Δ⁴-androsten-3-one,
6α-methyl-17β-tetrahydropyranyloxy-Δ⁴-androsten-3-one,
6β - methyl-17β-tetrahydropyranyloxy-Δ⁴-androsten-3-one,
6-fluoro-17β-tetrahydropyranyloxy-Δ⁴,⁶-androstadien-3-one,
6-chloro-17β-tetrahydropyranyloxy-Δ⁴,⁶-androstadien-3-one,
6-methyl-17β-tetrahydropyranyloxy-Δ⁴,⁶-androstadien-17β-ol-3-one,
6α-fluoro-17β-tetrahydropyranyloxy-19-nor-Δ⁴-androsten-3-one,
6β-fluoro-17β-tetrahydropyranyloxy-19-nor-Δ⁴-androsten-3-one,
6α-chloro-17β-tetrahydropyranyloxy-19-nor-Δ⁴-androsten-3-one,
6β-chloro-17β-tetrahydropyranyloxy-19-nor-Δ⁴-androsten-3-one,
6α-methyl-17β-tetrahydropyranyloxy-19-nor-Δ⁴-androsten-3-one,
6β-methyl-17β-tetrahydropyranyloxy-19-nor-Δ⁴-androsten-3-one,
6-fluoro-17β-tetrahydropyranyloxy-19-nor-Δ⁴,⁶-androstadien-3-one,
6-chloro-17β-tetrahydropyranyloxy-19-nor-Δ⁴,⁶-androstadien-3-one and
6-methyl-17β-tetrahydropyranyloxy-19-nor-Δ⁴,⁶-androstadien-3-one, respectively, were obtained.

I claim:
1. A compound represented by the general formula:

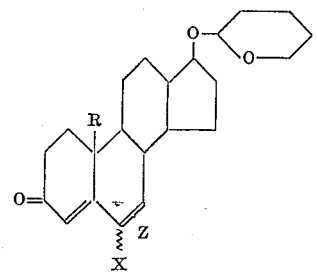

wherein R is selected from the group consisting of hydrogen and methyl, X is selected from the group consisting of methyl, fluoro and chloro and Z is selected from the group consisting of a saturated linkage and a double bond.

2. 6α - fluoro-17β-tetrahydropyranyloxy-Δ⁴-androsten-3-one.
3. 6β - fluoro-17β-tetrahydropyranyloxy-Δ⁴-androsten-3-one.
4. 6α-chloro - 17β - tetrahydropyranyloxy-Δ⁴-androsten-3-one.
5. 6β - chloro-17β-tetrahydropyranyloxy-Δ⁴-androsten-3-one.
6. 6α - methyl-17β-tetrahydropyranyloxy-Δ⁴-androsten-3-one.
7. 6β - methyl-17β-tetrahydropyranyloxy-Δ⁴-androsten-3-one.
8. 6-fluoro - 17β - tetrahydropyranyloxy-Δ⁴,⁶-androstadien-3-one.
9. 6-chloro - 17β - tetrahydropyranyloxy-Δ⁴,⁶-androstadien-3-one.
10. 6 - methyl-17β-tetrahydropyranyloxy-Δ⁴,⁶-androstadien-3-one.
11. 6α-fluoro - 17β - tetrahydropyranyloxy-19-nor-Δ⁴-androsten-3-one.
12. 6β - fluoro - 17β - tetrahydropyranyloxy-19-nor-Δ⁴-androsten-3-one.
13. 6α - chloro - 17β - tetrahydropyranyloxy-19-nor-Δ⁴-androsten-3-one.
14. 6β - chloro - 17β - tetrahydropyranyloxy-19-nor-Δ⁴-androsten-3-one.
15. 6α-methyl - 17β - tetrahydropyranyloxy-19-nor-Δ⁴-androsten-3-one.

16. 6β - methyl - 17β - tetrahydropyranyloxy-19-nor-Δ$^4$-androsten-3-one.

17. 6 - fluoro - 17β - tetrahydropyranyloxy-19-nor-Δ$^{4,6}$-androstadien-3-one.

18. 6 - chloro - 17β - tetrahydropyranyloxy-19-nor-Δ$^{4,6}$-androstadien-3-one.

19. 6 - methyl - 17β - tetrahydropyranyloxy-19-nor-Δ$^{4,6}$-androstadien-3-one.

References Cited by the Examiner

Manson et al.: "J. of Med. Chem.," vol. 6, No. 1, Jan. 18, 1963, pages 1–9.

Ruggieri et al.: "Gazz. Chim. Ital.," vol. 91, June 1961, pages 686–705.

LEWIS GOTTS, *Primary Examiner*.